United States Patent [19]

Nawata

[11] Patent Number: 5,465,096
[45] Date of Patent: Nov. 7, 1995

[54] TRANSMISSION APPARATUS FOR ORBITING SATELLITE

[75] Inventor: Hizuru Nawata, Tokyo, Japan

[73] Assignee: NEC Corporation, Japan

[21] Appl. No.: 367,687

[22] Filed: Dec. 30, 1994

Related U.S. Application Data

[63] Continuation of Ser. No. 202,960, Feb. 28, 1994, abandoned.

[30] Foreign Application Priority Data

Mar. 1, 1993 [JP] Japan ................................. 5-040118

[51] Int. Cl.⁶ ................................................. H04B 7/185
[52] U.S. Cl. ........................... 342/354; 342/375; 455/12.1
[58] Field of Search ................................. 342/375, 354, 342/357; 455/12.1, 13.1, 13.2, 13.3

[56] References Cited

U.S. PATENT DOCUMENTS

| | | | |
|---|---|---|---|
| 4,456,988 | 6/1984 | Nakagome et al. | 455/12 |
| 5,081,464 | 1/1992 | Renshaw | 342/375 |

OTHER PUBLICATIONS

Motorola Satellite Communications, Inc., "Iridium, A Low Earth Orbit Mobile Satellite System", Application Before the Federal Communications Commission, Washington, D.C., Dec. 1990.

Primary Examiner—Theodore M. Blum
Attorney, Agent, or Firm—Ostrolenk, Faber, Gerb & Soffen

[57] ABSTRACT

A transmission apparatus for an orbiting satellite which can establish stabilized frame synchronization even if the distance between the round-trip satellite and a communications terminal varies and which can minimize the displacement between a frame signal received on the ground and another frame signal generated in a communications terminal. The transmission apparatus comprises M (M is an integral number equal to or greater than 2) composers for forming frame signals, M transmitters for outputting M spot beams having different radiation directions, and M delay circuits interposed between the composers and the transmitters. The delay times of the delay circuits are set so that they are long where the radiation angles of the corresponding spot beams are small, but they are shorter where the radiation angles are larger.

16 Claims, 10 Drawing Sheets

TRANSMISSION APPARATUS FOR ORBITING SATELLITE

This is a Continuation of application Ser. No. 08/202,960 filed on Feb. 28, 1994, abandoned.

BACKGROUND OF THE INVENTION

1. Field of the Invention

This invention relates to a transmission apparatus of the frame signal communication type carried on an orbiting satellite in a satellite communications system which employs a plurality of orbiting satellites.

2. Description of the Related Art

A multiple connection communications system wherein communications are performed by way of communications satellites normally employs geostationary satellites on a geostationary orbit. However, also another system wherein orbiting satellites are used for communications has been proposed since the period of the dawn of satellite communications in the decade of 1950.

In recent years, as increase of the size of a rocket for launching a satellite proceeds, the technique of launching a large satellite with a small satellite carried thereon has been established and a rocket for launching a small satellite has been developed, which allows economical launching of a small satellite. Incidentally, particular attention is paid to a satellite communications system based on orbiting satellites wherein a plurality of small satellites make a round-trip along a low earth orbit or a medium earth orbit. The satellite communications system is advantageous, when compared with another system which employs geostationary satellites, in that it involves less transmission delay and a transmission/reception terminal can be reduced in size. The "IRIDIUM system" proposed by Motorola, Inc., United States is known as one of such satellite communications systems based on orbiting satellites.

FIG. 7 shows a general construction of a satellite communications system based on low earth orbit satellites. Referring to FIG. 7, the satellite communications system shown includes a plurality of orbiting satellites 101 to 103 and so forth, and a plurality of network control stations 104 to 107 and so forth disposed in communication areas of the orbiting satellites 101 to 103 such that at least one network control station is present in each of the communication areas. Each of the network control stations 104 to 107 connects a communication channel of a satellite to a subscriber network 109, performs accounting management and performs management of network subscribers thereof. Among the network control stations 104 to 107, particularly the network 107 serves as a reference station for controlling the entire network. A small size communications terminal 108 may be carried freely by a subscriber of the network or carried in an automobile.

Each of the orbiting satellites 101 to 103 irradiates a plurality of spot beams in different radiation directions toward the ground from a transmission apparatus carried thereon to form cells from the individual spot beams on the ground surface. Therefore, satellite communications which make use of orbiting satellites are called satellite cellular communications. In each cell, several different frequencies are repetitively used to effect communications and to make effective use of frequencies. Further, the power dissipation is reduced by use of spot beams. It is to be noted here that the distance between each orbiting satellite and the central point of a cell is different among different cells.

FIGS. 8 and 9 illustrate a variation of a cell in the satellite communications system shown in FIG. 7 with respect to time. For example, the communications terminal 108 which has been positioned in the cell A2 of the orbiting satellite 102 as seen in FIG. 7 moves from the cell A2 so that it is positioned in the cell C1 of the different orbiting satellite 101 in FIG. 8 as a result of simultaneous movement of the orbiting satellites 101 to 103 and so forth, and then moves from the cell C1 so that it is positioned in the cell B1 of the same orbiting satellite 101 in FIG. 9 as a result of such simultaneous movement as described above. In this manner, the communications terminal 101 can always communicate by way of a cell.

In the satellite communications system based on low earth orbit satellites, since the orbiting satellites move relative to a communicating person, the distance between a orbiting satellite and the communications terminal varies momentarily during communications, and also the propagation delay of a signal varies incidentally. Further, also when the communications terminal moves, the cell to which the communications terminal belongs changes over between different cells. However, this can be considered equivalent to the fact that the orbiting satellites move relative to the communications terminal.

In a multiple connection communications system, it is normally required that ground stations which participate in the system, that is, communications terminals, be all synchronized with the same frames in order for them to receive various control signals or make timings for transmission signals. To this end, a method is adopted wherein the communications terminals which participate in the system receive a common channel and detect, from within the channel, a frame signal called unique word inserted for each frame period and then establish synchronization using such detection signal.

FIG. 10 shows a general construction of an exemplary reception frame synchronization circuit. A clock signal generated in the communications terminal is counted by a counter 110, and the count value of the counter 110 is compared with a reference value by a comparator 111. The counter 110 is reset in response to a detection timing of a frame signal detected from the reception signal so that a frame signal synchronized with a coincidence pulse outputted from the comparator 111 is produced.

With the conventional transmission apparatus of an orbiting satellite, however, when it is tried to continue communications in the satellite communications system based on such low earth orbit satellites as described above, since the orbiting satellites are always moving relative to a communicating person, the distance between the orbiting satellite and the communications terminal varies with respect to time and the propagation delay of the frame signal varies during communications.

FIG. 11 shows that the cell successively changes over like A, B, ..., G relative to a communications terminal on the ground. It can be seen from FIG. 11 that the distance between the communications terminal and the orbiting satellite varies. FIG. 12 illustrates various timings when, although the distance varies in this manner, an adjustment of the delay time is not performed for each spot beam with respect to a frame signal sent out from orbiting satellite. Referring to FIG. 12, the frame number (1) indicates that a frame signal sent out by a spot beam which makes a cell A is received; the frame number (2) indicates that another frame number sent out by a spot beam which makes another cell B; ...; and similarly, the frame number (7) indicates that a further frame signal sent out by a spot beam which makes a cell G is received. When the distance between the orbiting satellite and the communications terminal on the ground varies with respect to time, the frame signal received and a frame produced in the communications terminal itself are displaced by a time corresponding to a difference in propagation delay amount.

In particular, while a plurality of spot beams are radiated toward the ground from an orbiting satellite, since the radiation directions of the spot beams are different from one another, the distance to the central point of a cell is different depending upon the magnitude of the radiation angle of the spot beam, and as the radiation angle increases, the distance increases. Accordingly, if an orbiting satellite transmits a frame signal merely as it is with a plurality of spot beams irrespective of the distances to the central points of the cells, since the propagation delay of the frame signal varies by variation of the distance between the orbiting satellite and the communications satellite, the frame signal received and the frame signal produced by a counter in the communications terminal as described hereinabove are displaced progressively from each other as time passes so that frame synchronization cannot finally be established appropriately any more in the communications terminal.

SUMMARY OF THE INVENTION

It is an object of the present invention to provide a transmission apparatus for an orbiting satellite which can establish stabilized frame synchronization even if the distance between the orbiting satellite and a communications terminal varies.

It is another object of the present invention to provide a transmission apparatus for an orbiting satellite which can minimize the displacement between a frame signal received on the ground and another frame signal generated in a communications terminal.

In order to attain the objects described above, according to the present invention, there is provided a transmission apparatus for an orbiting satellite, which comprises M input terminals, M being an integral number equal to or greater than 2, a frame generator for generating a frame synchronizing signal at a fixed interval, M composers for forming frame signals from respective transmission data received at the M input terminals in response to the frame synchronizing signal from the frame generator, M transmitters for receiving outputs of the M composers and outputting M spot beams having different radiation directions from one another, M delay circuits Individually interposed between the M composers and the M transmitters, and delay time setting means for setting the delay times of the M delay circuits so that the delay times are long where the radiation angles of the corresponding spot beams are small, but the delay times are shorter where the radiation angles are larger.

Where the orbiting satellite has a circular orbit, the delay time setting means may delay time of each of the delay circuits in accordance with the distance between the orbiting satellite and a center line of a cell produced from the corresponding spot beam on the ground so that the delay time, which increases in inverse proportion to the distance, is fixed for the delay circuit. In contrast, preferably the delay time setting means includes distance measurement means for measuring the distance from the orbiting satellite to the ground, and conversion means for converting measurement data from the distance measurement means into a delay time which increases in inverse proportion to the distance, the delay time being adjusted in accordance with a variation of the distance.

In the transmission apparatus for an orbiting satellite, when frame signals produced by the M composers are inputted to the M transmitters so as to radiate M spot beams having different radiation directions from the transmitters, the frame signals from the composers are provided with different delay times so that the delay times are long where the radiation angles of the corresponding spot beams are small, but the delay times are shorter where the radiation angles are larger. Consequently, even if the distance to the central point of a cell is different due to the difference of the radiation angle, the frame signal coincides in time between the different cells. Accordingly, stabilized frame synchronization can be established between the cells, and besides, the displacement between a frame signal received on the ground and another frame signal generated in a communications terminal is reduced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
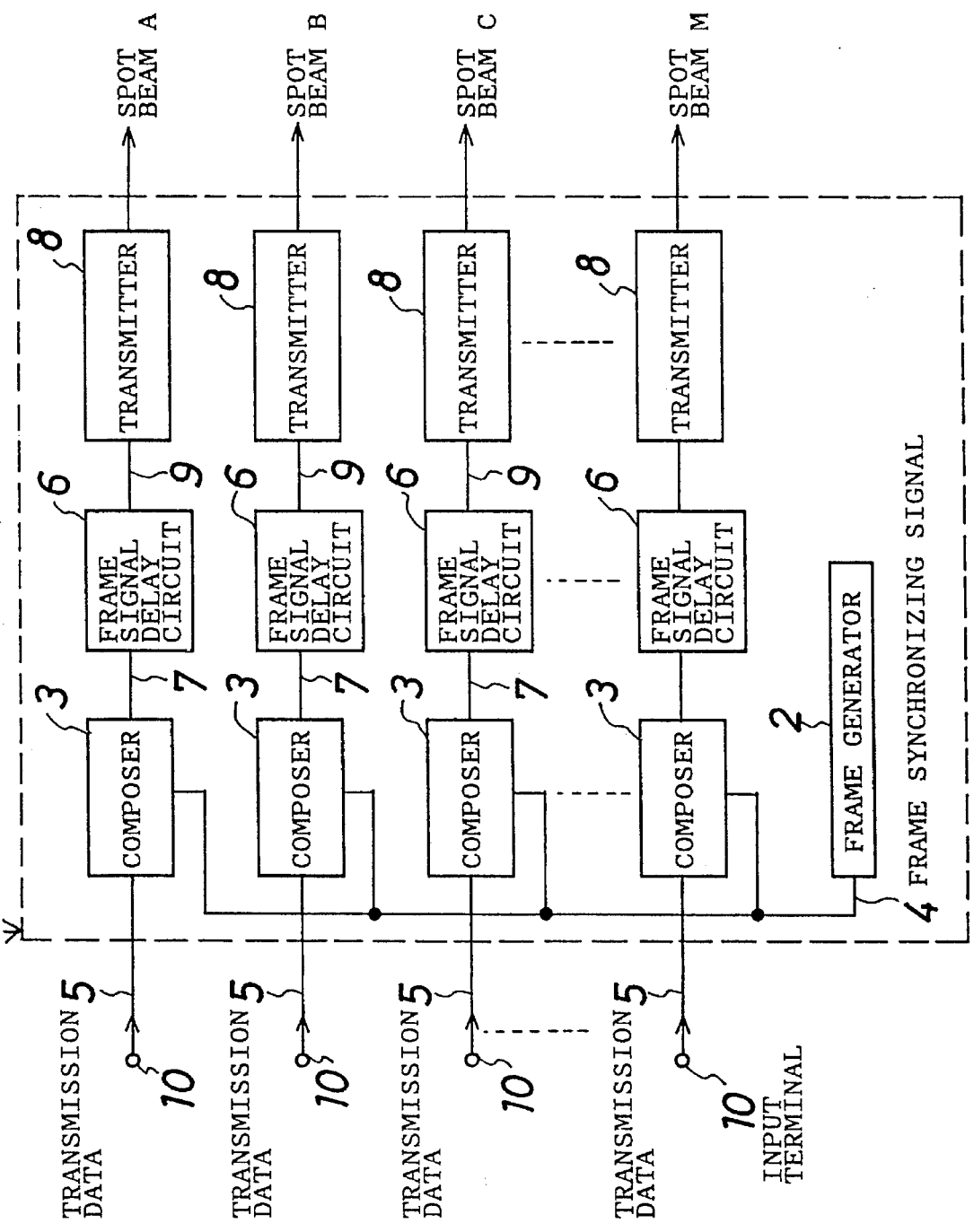
FIG. 1 is a block diagram of a transmission apparatus for an orbiting satellite showing a preferred embodiment of the present invention.

Referring first to FIG. 1, there is shown a transmission apparatus for orbiting satellite to which the present invention is applied. The transmission apparatus shown is generally denoted at 1 and includes M (M is an integral number equal to or greater than 2) input terminals 10, a frame generator 2 for generating a frame synchronizing signal 4 at a fixed interval, M composers 3 for producing frame signals 7 from transmission data 5 inputted to the M input terminals 10 in response to the frame synchronizing signal 4, M frame signal delay circuits 6 for providing delay times to the frame signals 7 from the M composers 3, and M transmitters 8 for receiving the delayed frame signals 9 from the M frame signal delay circuits 6 as modulation inputs and outputting spot beams A to M having different radiation directions and individually modulated in accordance with the modulation inputs.

Each of the delay times of the M frame signal delay circuits 6 is set so that it is long for any one of the M spot beams A to M having different radiation directions which has a large radiation angle, but is shorter for any one of the M spot beams A to M which has a smaller radiation angle. The delay times are fixed for the individual frame signal delay circuits 6 where the orbiting satellite has a circular orbit, but where the orbiting satellite has an elliptic orbit, the delay times are adjusted in response to a variation of the distance from the round-trip satellite to the ground.

Figure 2:
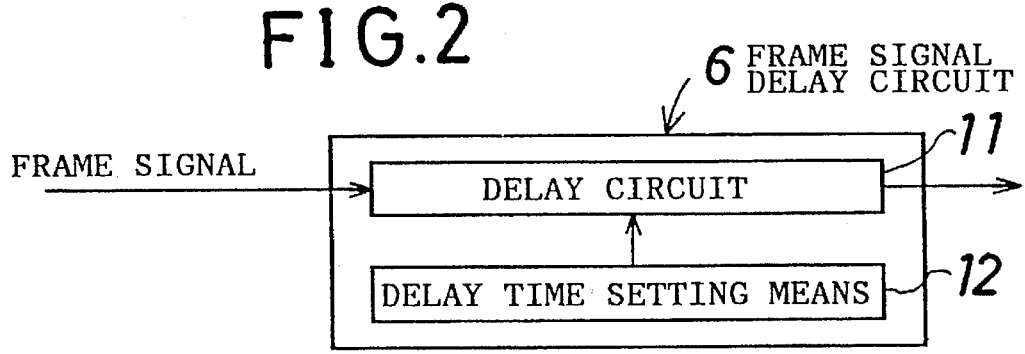
FIG. 2 is a block diagram showing a frame signal delay circuit where the delay time is fixed.

FIG. 2 shows a detailed construction of one of the frame signal delay circuits 6 where the delay time is fixed. In this instance, the frame signal delay circuit 6 is constituted from a delay circuit 11 and delay time setting means 12 for setting the delay time of the delay circuit 11 to a fixed value. The delay time is set in accordance with the distance between the orbiting satellite and the center line of a cell formed from the spot beam on the ground so that it may have a value which increases in inverse proportion to the distance.

Figure 3:
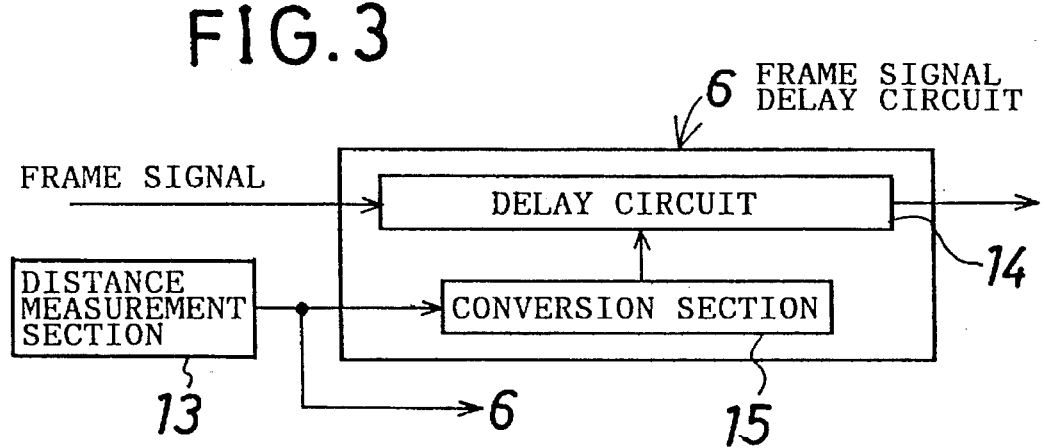
FIG. 3 is a block diagram showing a frame signal delay circuit where the delay time is variable.

Meanwhile, FIG. 3 shows a detailed construction of one of the frame signal delay circuits 6 where the delay time is variable. In this instance, a distance measurement section 13 is carried on each orbiting satellite to measure the distance from the orbiting satellite to the ground. Each of the frame signal delay circuits 6 is constituted from a delay circuit 14, and a conversion section 15 for converting measurement data from the common distance measurement section 13 into a delay amount. The delay circuit 14 receives the delay amount from the conversion section 15 and provides to a frame signal a delay time which increases in inverse proportion to the distance between the orbiting satellite and the center line of a cell produced from the spot beam on the ground.

Figure 4:
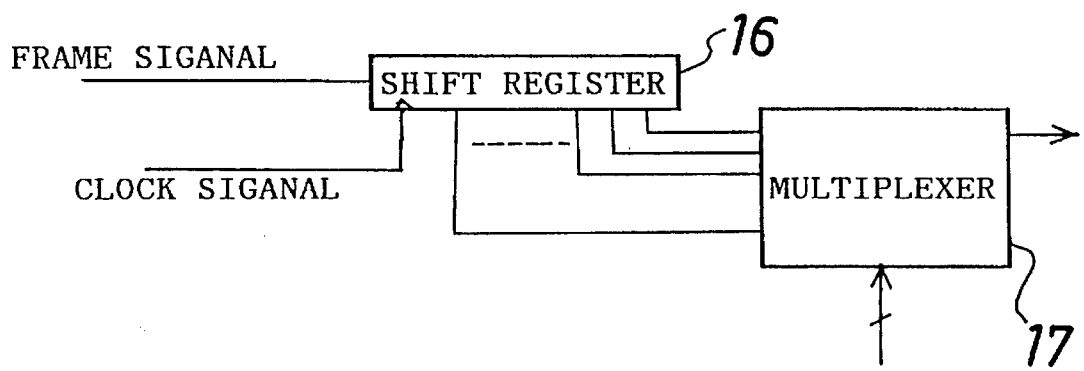
FIG. 4 is a block diagram showing a circuit arrangement of a delay circuit of the frame signal delay circuit of FIG. 3.

FIG. 4 shows a detailed construction of the delay circuit 11 or 14. The delay circuit shown in FIG. 4 is constituted from a shift register 16 for receiving a frame signal and producing a plurality of outputs which have delay times different in a stepwise fashion from one another, and a multiplexer 17 for selecting one of the outputs of the shift register 16. In the case of the delay circuit 11 shown in FIG. 2, the multiplexer 17 selects a fixed one of the outputs of the shift register 16 under the control of the delay time setting means 12, but in the case of the delay circuit 14 shown in FIG. 3, the delay amount from the conversion section 15 is inputted to the multiplexer 17 by way of a signal line, and the multiplexer 17 automatically selects one of the outputs of the shift registers 16 in response to the delay amount thus inputted.

Figure 5:
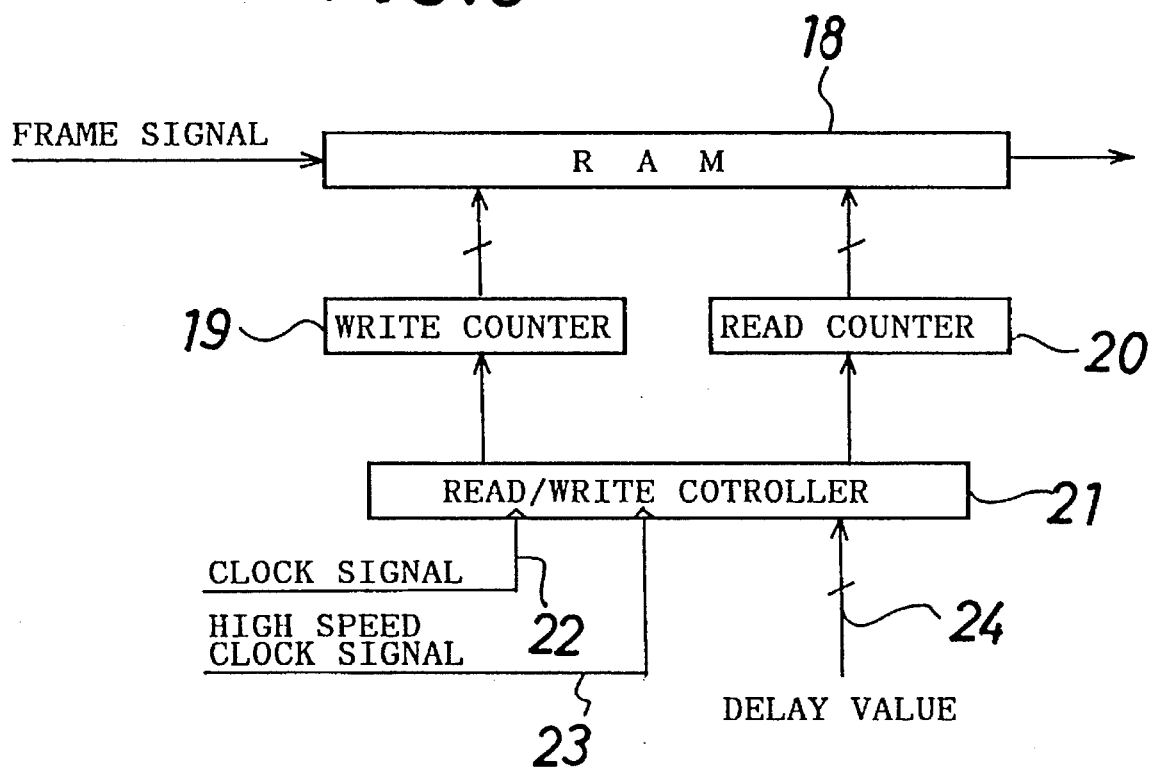
FIG. 5 is a block diagram showing another circuit arrangement of the delay circuit of the frame signal delay circuit of FIG. 3.

FIG. 5 shows another detailed construction of the delay circuit 11 or 14. The delay circuit shown in FIG. 5 is constituted from a RAM (Random Access Memory) 18 for receiving a frame signal, a write counter 19 for designating a write address for the RAM 18, that is, a writing point of time of the frame signal, a read counter 20 for designating a read address of the RAM 18, that is, a reading point of time of the frame signal, and a read/write controller 21 for controlling reading/writing. The controller 21 receives a clock signal 22 for being counted by the counters 20 and 21, a high speed clock signal 23 for allowing simultaneous writing with reading of the RAM 16, and a delay value 24. The delay value 24 is, in the case of the delay circuit 11 shown in FIG. 2, a fixed value set by the delay time setting means 12, but in the case of the delay circuit 14 shown in FIG. 3, a variable delay value provided from the conversion section 15.

Figure 6:
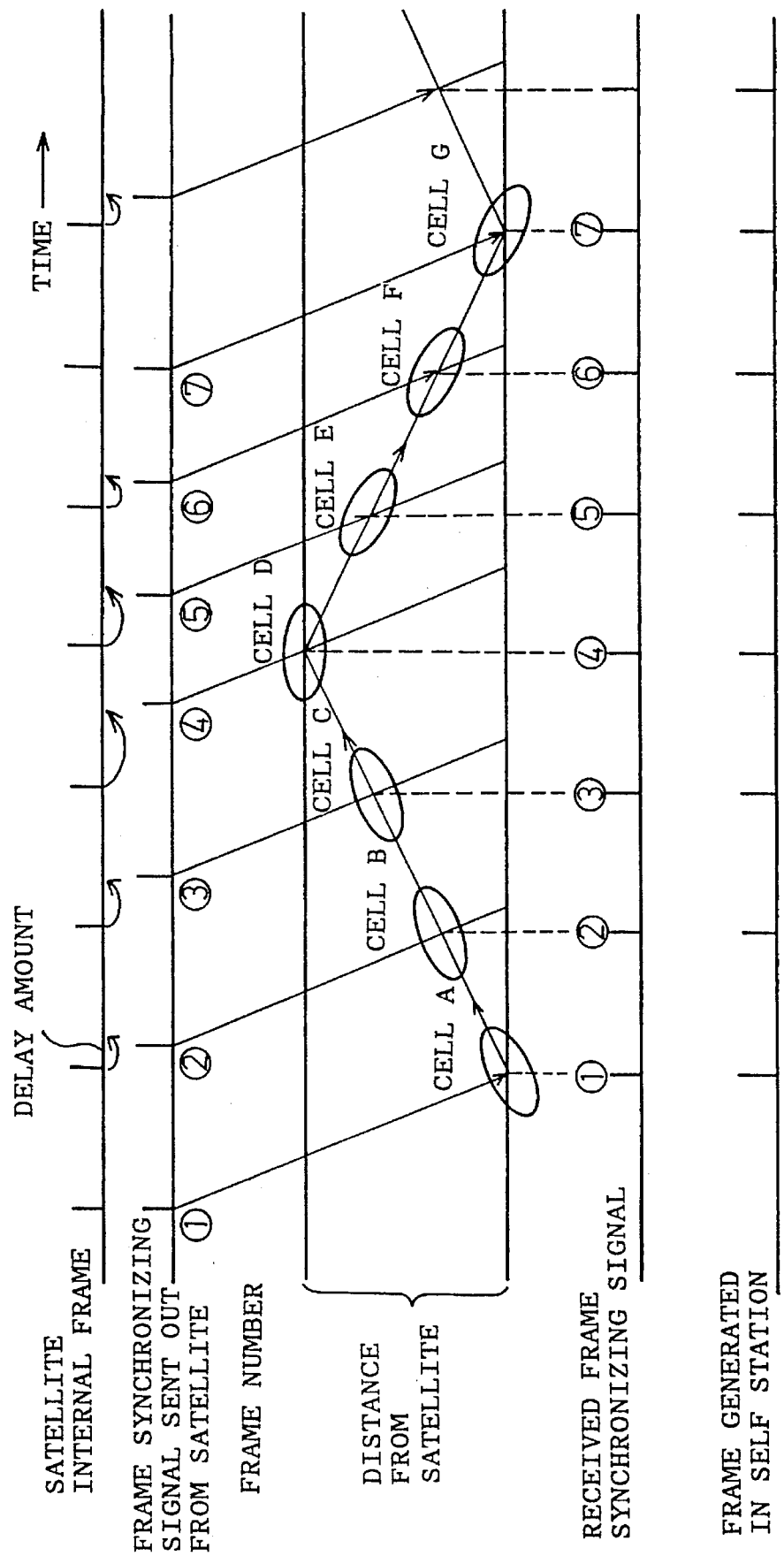
FIG. 6 is a diagram illustrating times when the delay time of frame signal to be sent out from a an orbiting satellite is adjusted for each spot beam.
Figure 7:
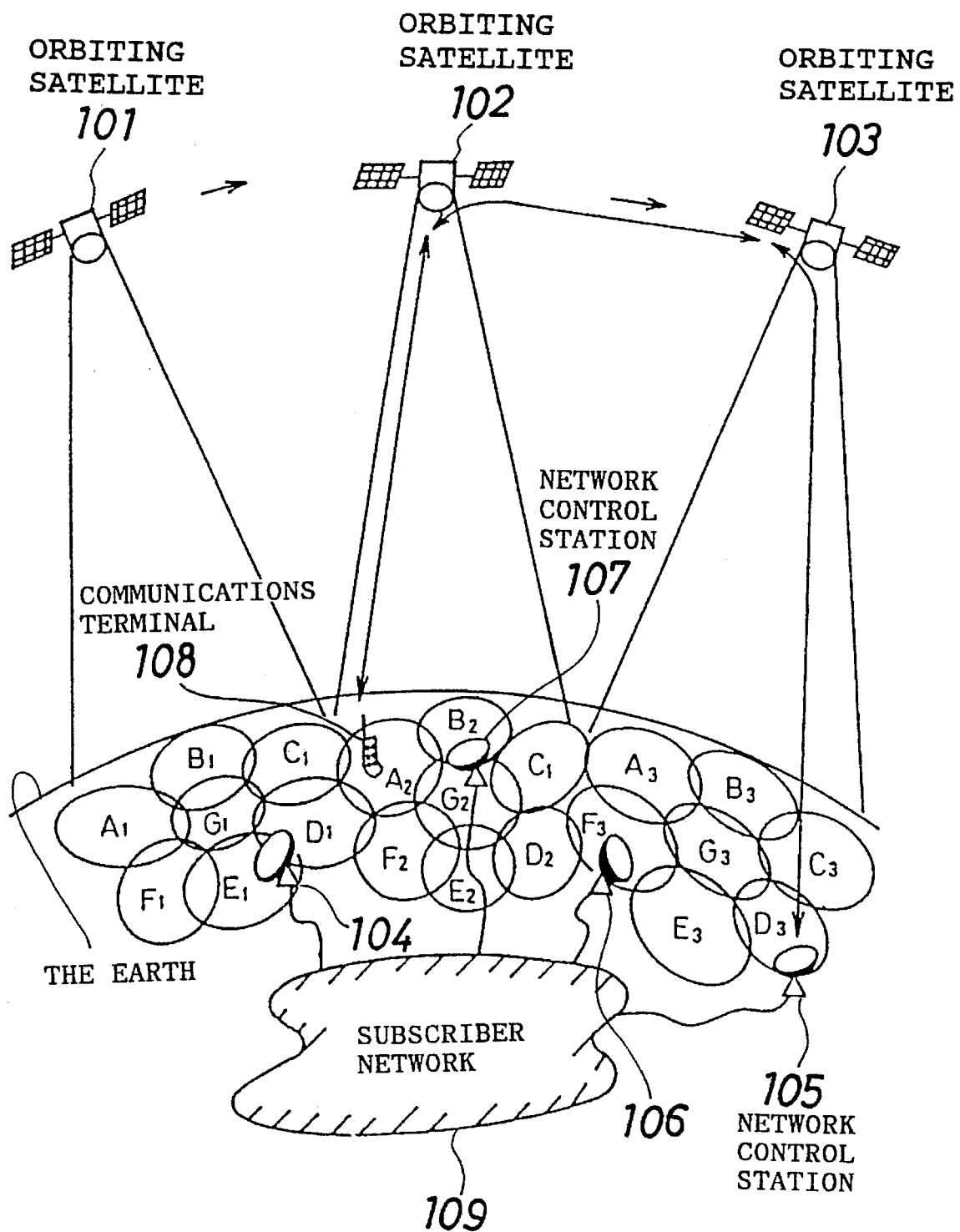
FIG. 7 is a schematic illustration showing a satellite communications system based on low earth orbit satellites.
Figure 8:
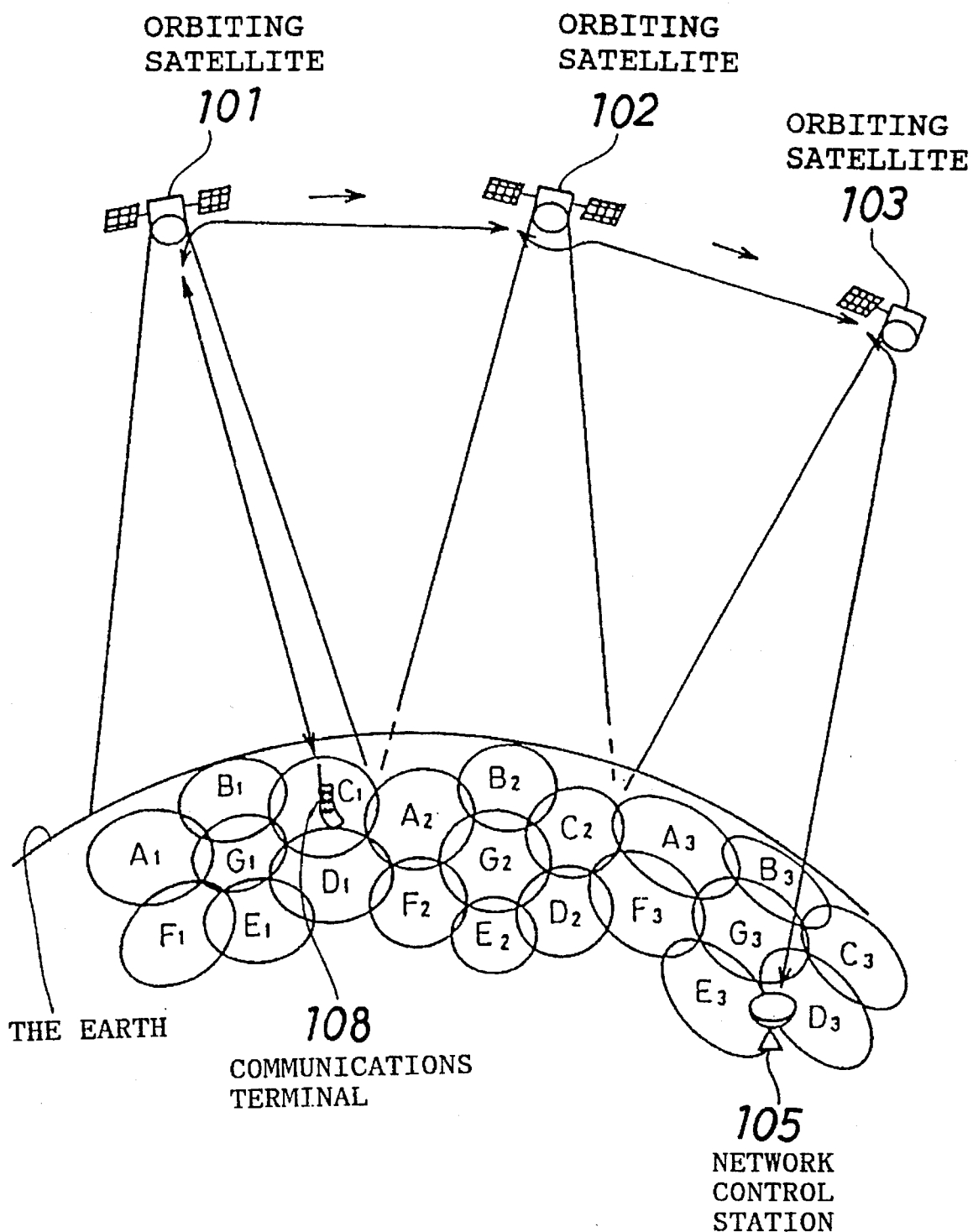
FIGS. 8 and 9 are similar views but illustrating a variation of a cell of the satellite communications system shown in FIG. 7 with respect to time.
Figure 9:
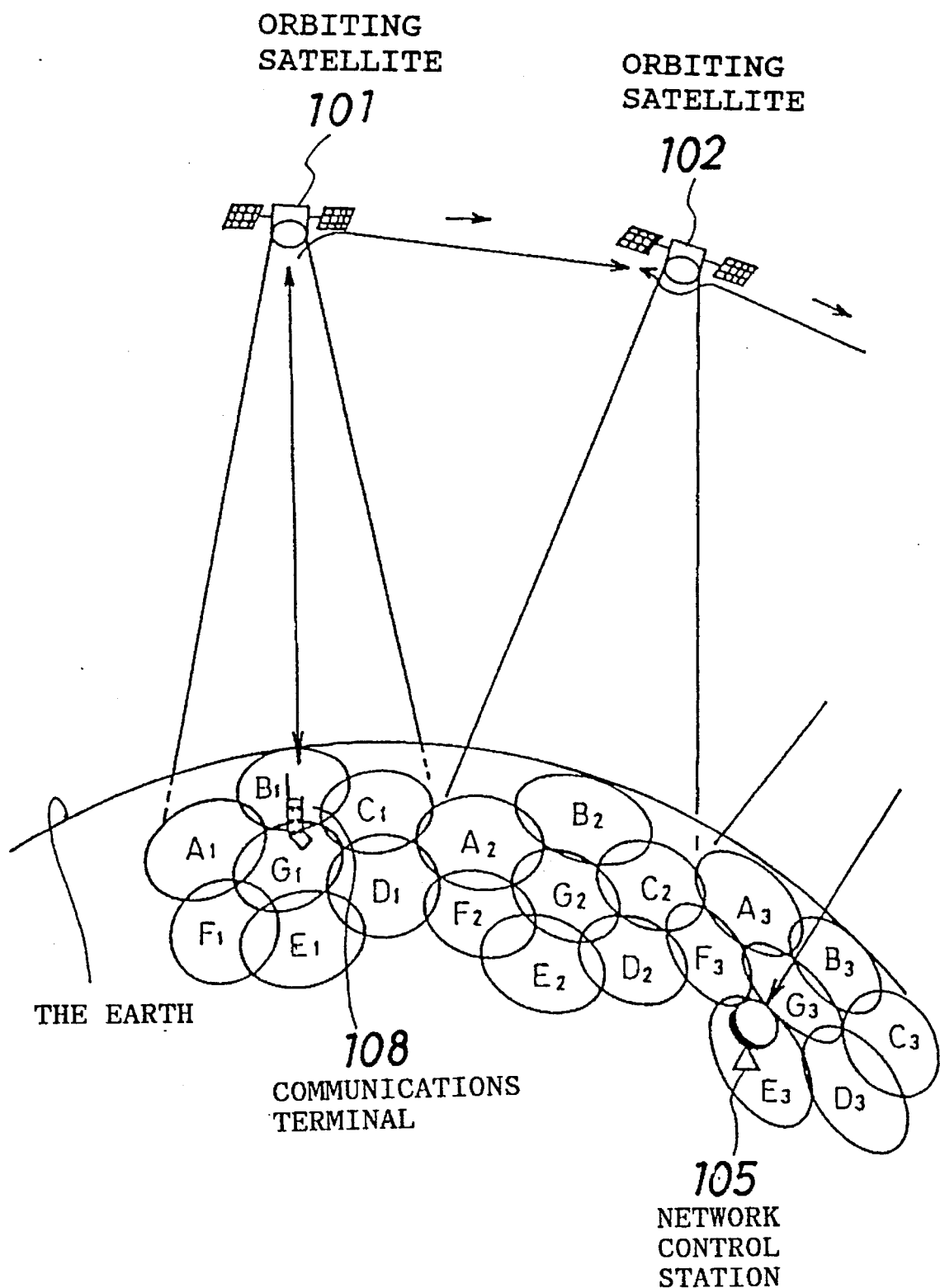
Figure 10:
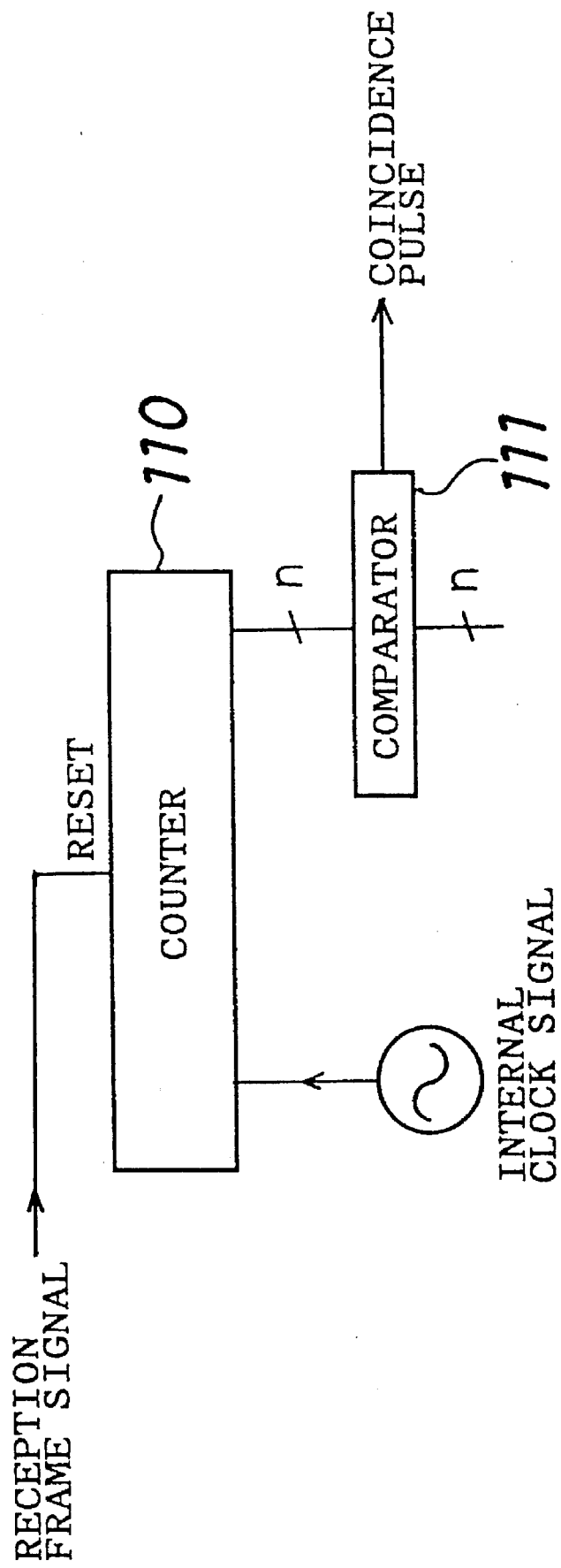
FIG. 10 is a block diagram showing a general construction of a reception frame synchronization circuit of a conventional transmission apparatus.
Figure 11:
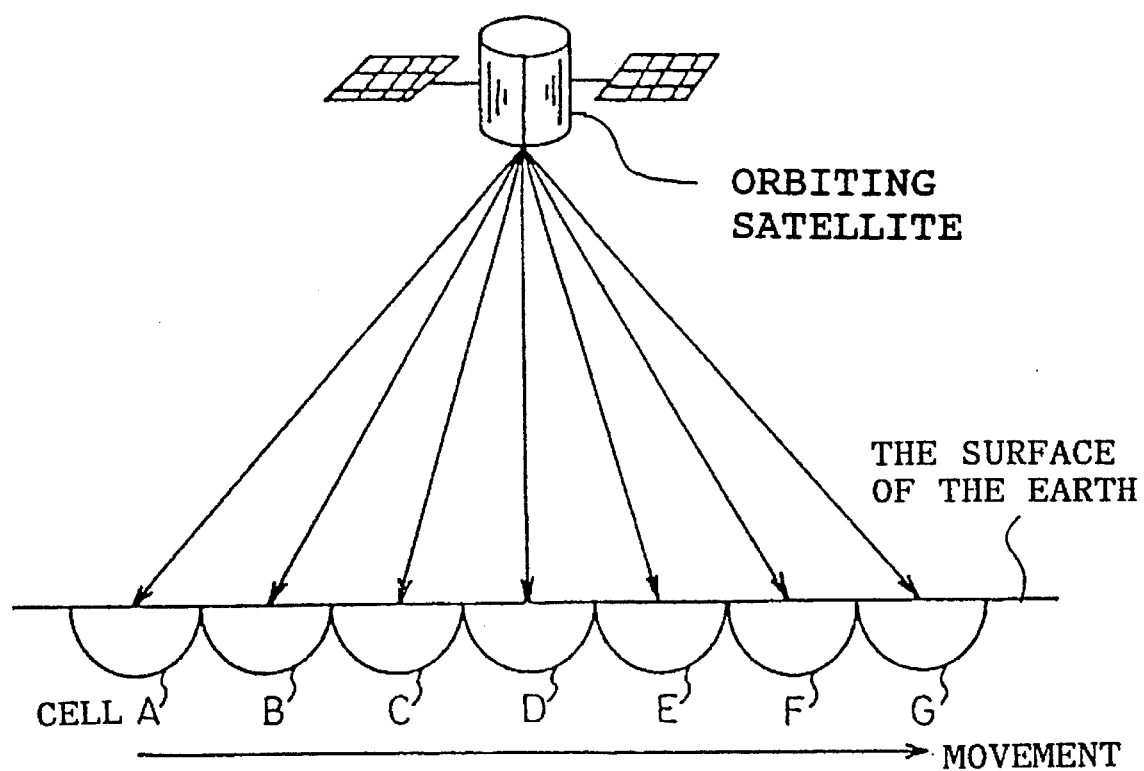
FIG. 11 is a diagrammatic view illustrating successive movement of a cell with respect to a communications terminal on the ground.
Figure 12:
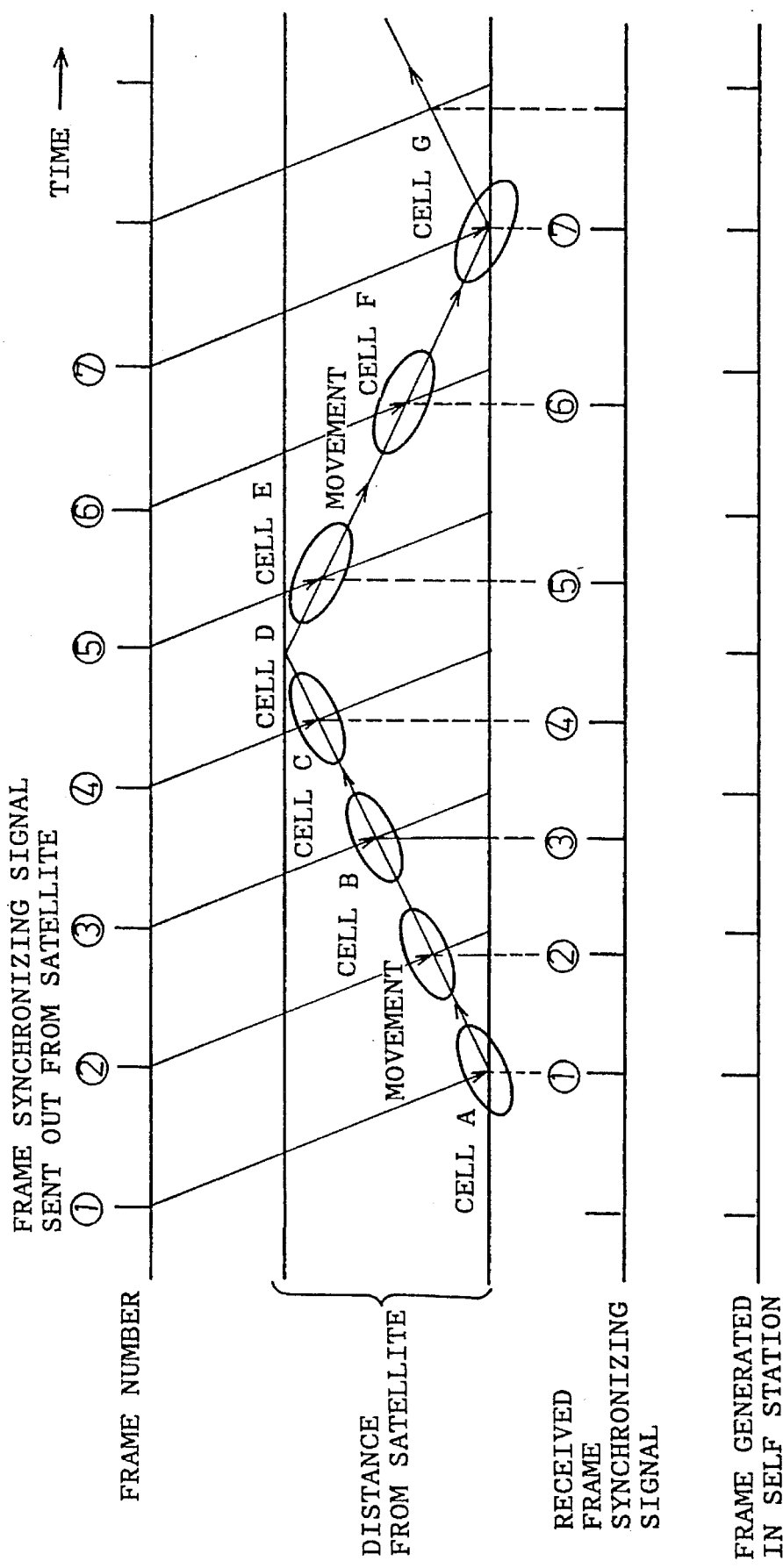
FIG. 12 is a diagrammatic view illustrating timings when an adjustment of the delay time of a frame signal to be sent out from an orbiting satellite is not performed for each spot beam.

FIG. 6 illustrates timings when an adjustment for the delay time of a frame signal to be sent out from the orbiting satellite is performed for each spot beam. Similarly as in the case of FIG.12, each of the frame numbers (1) to (7) indicates that a frame signal to be sent out by a spot beam which forms a corresponding one of the cells A to G is received. Each of the delay times for a frame signal of the orbiting satellite is set so that it is long for any one of the spot beams where the distance between the orbiting satellite and the central point of a cell formed from the spot beam is long, but is set shorter where the distance is greater. Where the delay times are adjusted in this manner, the frame signal received at a central location of a cell is held in synchronism with another frame signal generated in the communications terminal even if the cell formed from the spot beam is changed over. Consequently, stabilized frame synchronization can be assured. In this instance, the delay time produced within a same cell does not present any trouble if the cells are formed so that the delay times may be restrained within one symbol of a reception frame signal.

Meanwhile, when it is intended to utilize a received frame signal as a timing signal for transmitting a burst, there is no problem in practical use if the displacement of the frame signal is within a guard time between burst signals. in other words, the delay time which occurs within a same cell should be suppressed to such a degree as does not make any problem in practical use.

Having now fully described the invention, it will be apparent to one of ordinary skill in the art that many changes and modifications can be made thereto without departing from the spirit and scope of the invention as set forth herein.

What is claimed is:

1. A transmission apparatus for an orbiting satellite which travels around the earth along a low or intermediate orbit, comprising:

M input terminals, M being an integral number equal to or grater than 2;

a frame generator for generating a frame synchronizing signal at a fixed interval;

M composers for forming frame signals from respective transmission data received at said M input terminals in response to the frame synchronizing signal from said frame generator;

M transmitters for receiving outputs of said M composers and outputting M spot beams having different radiation directions from one another;

M frame signal delay circuits individually interposed between said M composers and said M transmitters; and delay time setting means for setting, for each of said M frame signal delay circuits, a delay time which varies inversely proportionally to the distance from the orbiting satellite to the center of a cell resulting from a corresponding spot beam transmitted to the earth.

2. A transmission apparatus for an orbiting satellite as claimed in claim 1, wherein said delay time setting means includes distance measurement means for measuring the distance from said orbiting satellite to the ground, and conversion means for converting measurement data from said distance measurement means into a delay time which increases in inverse proportion to the distance, the delay time being adjusted in accordance with a variation of the distance.

3. The transmission apparatus for an orbiting satellite as claimed in claim 1, wherein said frame signal delay circuit comprises:

a delay circuit receiving the frame signal output of said composer and outputting a signal having a delay time; and said delay time setting means determines the delay time of the output signal of said delay circuit.

4. The transmission apparatus for an orbiting satellite as claimed in claim 3, wherein said delay circuit comprises:

a shift register receiving the frame signal output of said composer, and producing outputs having delay times which differ from each other in a stepwise fashion; and a multiplexer selecting one of the outputs of said shift register as the output of said delay circuit.

5. The transmission apparatus for an orbiting satellite as claimed in claim 3, wherein said delay circuit comprises:

a random access memory receiving the frame signal output of said composer, and producing the output of said delay circuit;

a write counter designating a write address for said random access memory;

a read counter designating a read address of said random access memory; and a controller which controls the write operation of said write counter and the read operation of said read counter, said controller receives a clock signal for use by said counters, a high speed clock signal for simultaneous writing and reading of said random access memory, and a delay time from said delay time setting means.

6. The transmission apparatus for an orbiting satellite as claimed in claim 1, further comprising:

a distance measurement section which measures the distance from the orbiting satellite to the earth;

said frame signal delay circuit includes;

a conversion section which converts the distance measurement determined by the distance measurement section into a delay time; and a delay circuit receiving the frame signal output of said composer, and based on the delay time of said conversion section, outputs a frame signal having a delay time.

7. The transmission apparatus for an orbiting satellite as claimed in claim 6, wherein said delay circuit comprises:

a shift register receiving the frame signal output of said composer, and producing outputs having delay times which differ from each other in a stepwise fashion; and a multiplexer selecting an output of said shift register based on the delay time determined by said conversion section.

8. The transmission apparatus for an orbiting satellite as claimed in claim 6, wherein said delay circuit comprises:

a random access memory receiving the frame signal output of said composer, and producing the output of said delay circuit;

a write counter designating a write address for said random access memory;

a read counter designating a read address of said random access memory; and a controller which controls the write operation of said write counter and the read operation of said read counter, said controller receives a clock signal for use by said counters, a high speed clock signal for simultaneous writing and reading of said random access memory, and a delay time from said conversion section.

9. A transmission apparatus for an orbiting satellite, comprising:

input terminals for receiving transmission data;

a frame generator which generates a frame synchronizing signal at a fixed interval;

composers receiving transmission data from said input terminals and outputting frame signals in response to the frame synchronizing signal for said frame generator;

frame signal delay circuits which receive the frame signal outputs of the composers and interpose a delay time to each such frame signal output;

transmitters processing the delayed frame signal outputs of said frame signal delay circuits and transmitting to earth spot beams having different radiation directions, wherein the spot beams result in communication cells on earth; and the delay time interposed on each output signal of said frame signal delay circuits varies inversely proportionally to the distance from the orbiting satellite to the center of a communication cell on earth.

10. The transmission apparatus for an orbiting satellite as claimed in claim 9, wherein said frame signal delay circuit comprises:

a delay circuit receiving the frame signal output of said composer and outputting a signal having a delay time; and a delay time setting means for determining the delay time of the output signal of said delay circuit 11. The transmission apparatus for an orbiting satellite as claimed in claim 9, wherein said delay circuit comprises:

a shift register receiving the frame signal output of said composer, and producing outputs having delay times which differ from each other in a stepwise fashion; and a multiplexer selecting a fixed one of the outputs of said shift register as the output of said delay circuit.

12. The transmission apparatus for an orbiting satellite as claimed in claim 10, wherein said delay circuit comprises:

a random access memory receiving the frame signal output of said composer, and producing the output of said delay circuit;

a write counter designating a write address for said random access memory;

a read counter designating a read address of said random access memory; and a controller which controls the write operation of said write counter and the read operation of said read counter, said controller receives a clock signal for use by said counters, a high speed clock signal for simultaneous writing and reading of said random access memory, and a delay time from said delay time setting means.

13. The transmission apparatus for an orbiting satellite as claimed in claim 9, further comprising:

a distance measurement section which measures the distance from the orbiting satellite to the earth;

said frame signal delay circuit includes;

a conversion section which converts the distance measurement determined by the distance measurement section into a delay time; and a delay circuit receiving the frame signal output of said composer, and based on the delay time of said conversion section, outputs a frame signal having a delay time.

14. The transmission apparatus for an orbiting satellite as claimed in claim 13, wherein said delay circuit comprises:

a shift register receiving the frame signal output of said composer, and producing outputs having delay times which differ from each other in a stepwise fashion; and a multiplexer selecting an output of said shift register based on the delay time determined by said conversion section.

15. The transmission apparatus for an orbiting satellite as claimed in claim 13, wherein said delay circuit comprises:

a random access memory receiving the frame signal output of said composer, and producing the output of said delay circuit;

a write counter designating a write address for said random access memory;

a read counter designating a read address of said random access memory; and a controller which controls the write operation of said write counter and the read operation of said read counter, said controller receives a clock signal for use by said counters, a high speed clock signal for simultaneous writing and reading of said random access memory, and a delay time from said delay time setting means.

16. A transmission apparatus for an orbiting satellite, comprising:

input terminals for receiving transmission data;

a frame generator which generates a frame synchronizing signal at a fixed interval;

composers receiving transmission data from said input terminals and outputting frame signals in response to the frame synchronizing signal for said frame generator;

frame signal delay circuits which receive the frame signal outputs of the composers and interposes a delay time to each such frame signal output;

transmitters processing the delayed frame signal outputs of said frame signal delay circuits and transmitting to earth spot beams having different radiation directions, wherein the spot beams result in communication cells on earth; and the delay time interposed on each output signal of said frame signal delay circuits increases as the radiation angle of the spot beams increases, thus the delay time varies inversely proportionally to the distance from the orbiting satellite to the center of a communication cell on earth.

* * * * *